Figure 1:
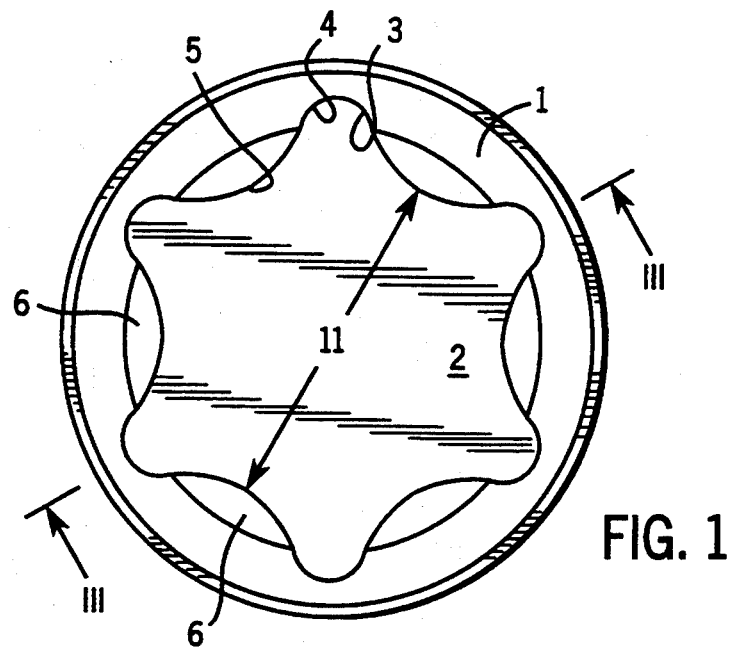

United States Patent [19]

Schuster

[11] Patent Number: 5,435,680
[45] Date of Patent: Jul. 25, 1995

[54] SCREW DRIVE CONSTRUCTION

[75] Inventor: Armin Schuster, Forchtenberg, Germany

[73] Assignee: Adolf Wurth GmbH & Co. KG, Kuenzelsau, Germany

[21] Appl. No.: 183,042

[22] Filed: Jan. 14, 1994

Related U.S. Application Data

[63] Continuation of Ser. No. 919,529, Jul. 24, 1992, abandoned.

[30] Foreign Application Priority Data

Jul. 24, 1991 [DE] Germany ............................ 4124472

[51] Int. Cl.⁶ ........................ F16B 23/00; F16B 35/06
[52] U.S. Cl. .................... 411/404; 411/403; 411/919; 81/436; 81/460
[58] Field of Search ............... 411/402, 403, 404, 405, 411/919; 81/436, 460

[56] References Cited

U.S. PATENT DOCUMENTS

| | | | |
|---|---|---|---|
| 3,584,667 | 6/1971 | Reiland | 411/402 X |
| 3,656,397 | 4/1972 | Kudelko . | |
| 5,019,080 | 5/1991 | Hemer | 411/402 X |
| 5,207,132 | 5/1993 | Goss et al. | 411/405 X |
| 5,219,253 | 6/1993 | Shinjo | 411/403 |

FOREIGN PATENT DOCUMENTS 2211068 7/1974 France .

*Primary Examiner*—Neill R. Wilson
*Attorney, Agent, or Firm*—Quarles & Brady

[57] ABSTRACT

For its drive a screw is given a recess, which has an outer contour diverging from the circular shape. In the radial inner area and/or radial outer area of the recess the side walls are formed by individual surfaces located on a conical surface.

9 Claims, 2 Drawing Sheets

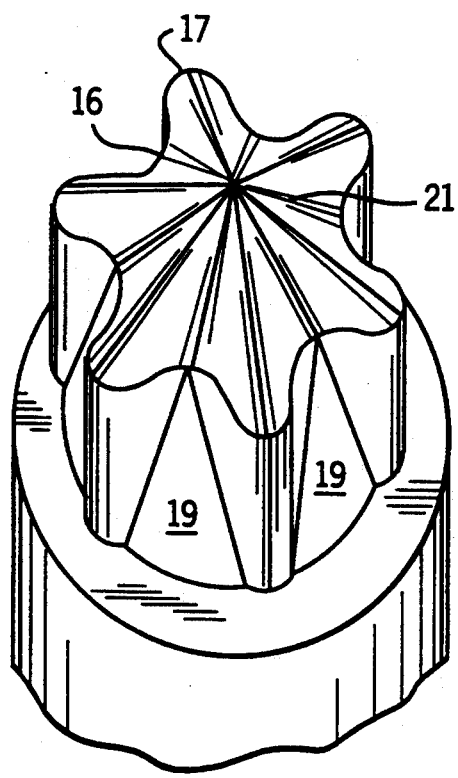
FIG. 4
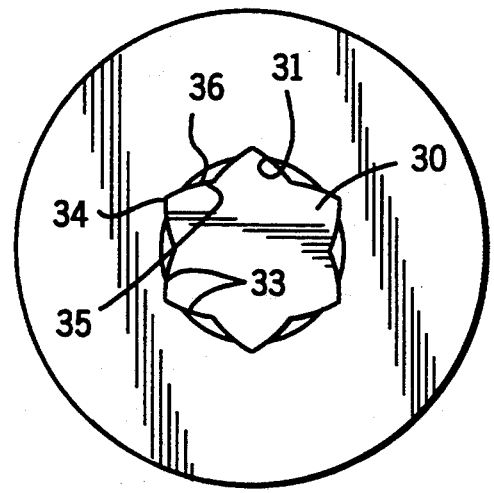
FIG. 5
FIG. 6
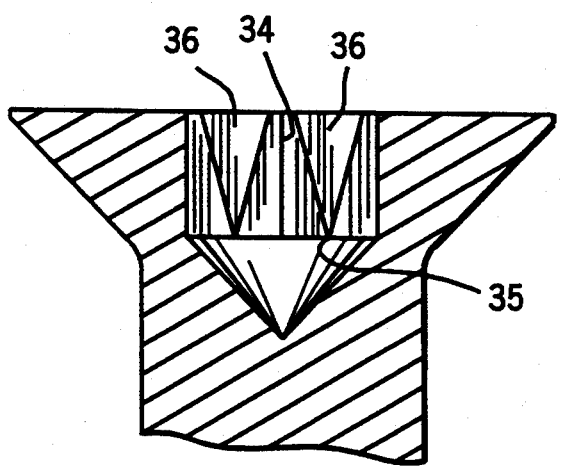

SCREW DRIVE CONSTRUCTION

This is a continuation of application Ser. No. 07/919,529 filed Jul. 24, 1992, now abandoned.

The invention relates Lo a screw with a recess or projection for inserting or attaching a tool or screw drive construction.

In a widely used screw the recess for inserting a screwdriver is cruciform, so that this screw is also known as a cross-slotted screw. The side walls of the recess and which are used for transmitting the torque applied by the operator, have a specific inclination with respect to a longitudinal section through the screw. On initialing a torque part of the force, as a result of the inclined configuration, is diverted into a force which attempts to force the screwdriver out of the slot. In the case of difficult screws there is consequently a tendency to force the screwdriver out of the slot. Therefore the torsional force available for inserting the screw is limited. The sloping configuration of the side walls is appropriate for a obtaining a good seating action and for centring purposes when inserting the screwdriver.

It is also known to make in screw heads depressions or recesses, whose side walls are parallel to the longitudinal axis of the screw. Although this does not lead to a force component which attempts to force the screwdriver out of the recess again, other problems still occur. In order to permit the insertion of the tool, the latter must have a somewhat smaller size than the recess, which means that there must be a gap all round the tool. On initialing a torque there is consequently only an engagement on individual projections, which as a rule is only linear. If account is also taken of the fact that the tool and/or the screw can diverge, due to manufacturing tolerances, from the ideally desired shape, it is possible for cases to occur when only two of several bearing surfaces are used. An example for such a recess shape is a hexagonal recess or one which is bounded by contiguous arcs. They can be alternatively curved inwards and outwards, or all can be curved in the same direction. In a known drive construction (WO-83/02983), there are several convexly curved lateral faces, whose contact edges form alternately. outwardly and inwardly directed edges.

A screw is also known (DE-A1-35 01 414) in which a drive recess and an associated tool have individual radial vanes or wings with radial, planar side walls. The outsides of the vanes are located on a conical or pyramidal surface coaxial to the longitudinal axis of the screw. As a result of the radially directed lateral faces of the vanes, the latter have an outwardly increasing width, but which does not contribute to the strength of the tool. In the case of a shape of the tool for inserting the screw which diverges from the mathematically desired shape, with such a construction there are linear contacts on the individual vanes and as a result there may be only an engagement on some of the six vanes.

In another known screw head shape (U.S. Pat. No. 3,584,667), the outer circumference of the cylindrical recess or the cylindrical projection is formed by alternately inwardly and outwardly directed arcs, which tangentially pass into one another and in which the inwardly directed arcs have twice the diameter of the outwardly directly arcs. As a result of this construction the contact surface between the tool and the screw is increased and is no longer located on a line. However, as a result of the gap which is necessary between the tool and the screw head forces occur, which act on the tool at right angles to the longitudinal direction. Although this leads to an improved engagement for torque transmission, it may also lead to an eccentric positioning of the tool.

The problem of the invention is to provide a drive construction for a screw, in which a good guidance of the tool in the screw and the transmission of a high torque are ensured without there being any risk of the tool being forced out. The screw is intended to be more particularly suitable for mechanical insertion. A further aim is to increase the life of the tools used for producing the screw.

According to the invention this problem is solved by a screw having the features of the independent claims. Further developments form the subject matter of subclaims. For handling the screw proposed according to the invention a screwdriver is proposed which has the features of the corresponding claims. The term screwdriver is understood to moan a screw drive tool, as well as a wrench or spanner.

Due to the fact that the parts of the side wall not located on the conical surface are substantially parallel to the rotation axis of the screw, i.e. in each longitudinal section parallel to the longitudinal axis of the screw no force components occur which attempt to force the screwdriver out of the recess or remove the wrench from the projection. The conical surfaces on the screw and/or screwdriver cannot bring about such a tool removal, because they do not have radially directed surface portions.

With the screw proposed by the invention the tool is guided on the conical surface, whilst the non-circular parts projecting inwards or outwards over the conical surface are used for the transfer of the tool. As a result of the guidance a tool centring is simultaneously brought about, so that as a result of the tolerances non-uniformly constructed tools and/or screws do not engage on one another in a non-uniform manner.

In the case of a recess, the conical surface can both be in the inner region of the wide walls and in the outer region thereof, so that here inafter reference is also made to an inner and an outer cone.

Further features, details and advantages of the invention can be gathered from the following description of preferred embodiments with reference to the drawings, wherein show:

FIG. 1—A plan view of the drive end of a screw with a recess located therein.

Figure 2:
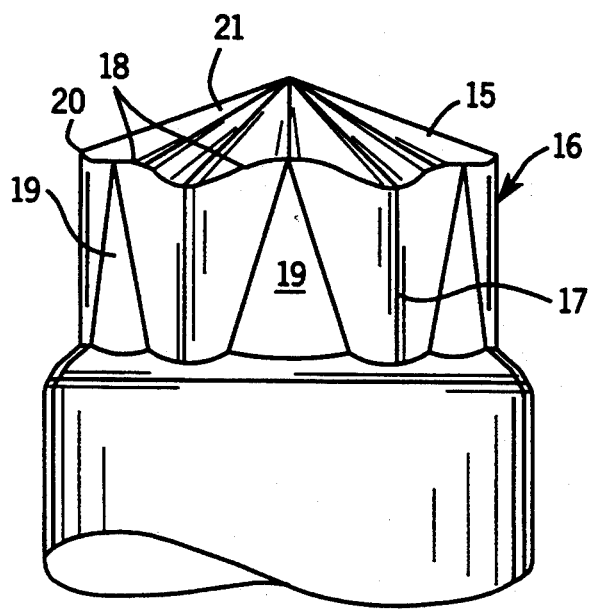

FIG. 2—A side view of the free end of a screwdriver.

Figure 3:
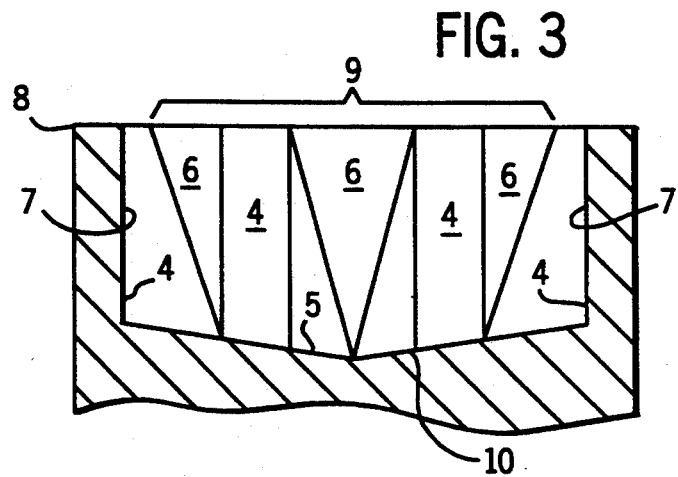

FIG. 3—A section through the drive end of the screw in FIG. 1

FIG. 4—A perspective view of the tool end of FIG. 3.

FIG. 5—A plan view of the drive end of a countersunk screw with a modified drive recess.

FIG. 6—A longitudinal section through the screw drive end of the countersunk screw of FIG. 5.

FIG. 1 is a plan view of a screw head, such as can be located at the end of a screw. In said end 1 is shaped a recess 2 and this can e.g. take place by cold extrusion or the like. The recess 2 serves to receive a screw drive tool, e.g. a screwdriver or the like. In order that a torque can be transmitted, the side wall 3 of the recess 2 forms a contour diverging from a circular shape. In the represented embodiment the outer contour is formed by six outwardly curved arcs 4, which are interconnected by inwardly curved arcs 5 and the inwardly curved arcs 5 have twice the radius. The side wall 3 of the recess 2 is formed in a radially inwardly directed area, i.e. in the vicinity of the inwardly directed arcs 5, by surfaces 6, which are uniformly distributed over the circumference of the recess 2 and which are located on a conical surface. The conical surface belongs to an imaginary cone, which is oriented in such a way that the apex of the cone is directed into the recess 2.

In place of the outer contour of the recess 2 formed by alternately concavely and convexly curved arcs, it would also be possible to have a recess in the screw head, whose outer contour is formed by a regular polygon, e.g. a hexagon. Here again the individual parts of the side wall are directed alternately outwards and inwards with respect to a fixed radius. Here again the recess in the inner marginal area of the side wall could be formed by such conical surfaces 6.

The cross-section of FIG. 3 shows the recess 2 from the side. The cross-section of FIG. 3 is along line III—III of FIG. 1, i.e. it extends along the largest transverse dimension of the recess 2. The side walls which can be seen to the right and left in cross section consequently belong to the outwardly directed arcs 4 and said side walls 7 are parallel to the longitudinal or rotational axis of the screw.

Between in each case two outwardly directed arcs 4 is provided a conical surface 6. These surfaces 6 are constructed in such a way that in the interior of the recess 2 they reduce their width and spacing from the rotational axis and consequently form a type of frustum.

As can be gathered from both the plan view of FIG. 1 and the cross-section of FIG. 3, at the outer end 8 of the recess 2 the diameter 9 of the cone on which are located the conical surfaces 6 is smaller than the maximum transverse dimension of the recess 2 defined by the spacing of the two side walls 7. In the vicinity of the bottom 10 of the recess 2 the diameter of the cone is the same as the minimum transverse dimension 11 of the recess shown in FIG. 1.

If the conical surfaces were not in the radial inner area of the recess, but instead in the radial outer area, then the diameter of the cone at the outer end 8 of the recess would be the same as the maximum transverse diameter and on the bottom would be larger than the minimum transverse dimension 11.

FIG. 2 shows the end of a screwdriver or the like enabling the screw according to FIGS. 1 and 3 to be driven in. At the end of the tool is provided a projection 15, which has a side wall 16 all around it. The side wall 16 is formed by outwardly directed arcs 17 and, between them, inwardly directed arc portions 18 having twice the radius. A plan view on the end of FIG. 2 would show no difference compared with FIG. 1. In the radially inner side wall area the side wall is formed by conical surfaces 19, which are in all cases located on a cone. The apex of the cone is directed upwards in FIG. 2, i.e. away from the tool end or into the recess 2 of FIG. 2.

At the free end 20 of the projection 15 the diameter of the cone is the same as the minimum transverse dimension of the projection 15, whereas at the end of the projection 15 remote from the free end the diameter of the cone is smaller than the maximum transverse dimension of the projection 15. The free end of the projection 15 is formed by a very flat cone 21, which roughly corresponds to the conical bottom 10 of the recess 2.

FIG. 4 shows in a perspective view the arrangement according to FIG. 2. In order to better show the flat conical shape of the cone 21, individual lines are shown, but are not intended to represent ribs or the like.

If a tool with the projection according to FIG. 2 is inserted in the screw head recess 20 then the conical surfaces 19 and 6 come into reciprocal engagement and guide the tool in clearance-free manner during rotation about the rotational or longitudinal axis of the screw. Therefore the rounded projections 17 of the tool engage in the outwardly directed arc 4 of the side wall of the recess 2. As a result of the centring of the tool with respect to the screw with the aid of the two cones 6, 19, this leads to a more uniform engagement of the projections of the cross-section of the tool projection. During rotation the only forces which occur act in the rotational direction, so that the tool is not forced out of the recess.

Whilst FIGS. 1 and 3 show a recess in a drive end of a screw and FIGS. 2 and 4 the complementary shaped parts of a tool, it would obviously be possible to reverse this, i.e. to have a projection at the screw end in the manner shown in FIGS. 2 and 4 and a recess in the tool as shown in FIGS. 1 and 3.

The conical surface cannot only be used in the case of the represented shape of the recess or projection. Also in the case of a normal slot in a screw head such a conical surface can lead to particularly good results. A central conical surface in the case of slot can e.g. prevent lateral sliding off, which can occur with slotted screws. This also applies in connection with cross-slotted screws.

FIGS. 5 and 6 shows a screw in which the drive construction 30 once again has a side wall 31, which is located on the cylindrical surface of a cylinder. The outer contour is formed by the arcs 33 arranged in such away that the alternately outwardly directed projections 34 and inwardly directed projections 35 are formed. All the arcs 33 are oriented in such a way that the curvature is always directed outwards. In the vicinity of the inwardly directed projections 35 the side walls are located on a conical surface 36, the maximum diameter of the latter being smaller than the maximum transverse dimension of the drive recess 30, whilst the minimum diameter of the conical surface 36 is the same as the smallest transverse dimension of the drive recess 30. The arrangement of the conical surface can be clearly gathered from FIG. 6, where it can be seen that said conical surfaces are positioned in such a way that the outwardly directed edges 34 of the drive recess 30 are retained, whereas the inwardly directed projections 35 are flattened by the conical surface 36.

Also in the case of the shape of the side wall 31 of the recess 30 shown in FIGS. 5 and 6, during driving forces occur, which act radially inwards, so that the screw drive tool is centred on the conical surface 36. The non-conical parts of the side wall are consequently shaped in such a way that during the driving of the screw the torque leads to a force component in the circumferential direction and a force component in the radial direction. The shape of the side wall of the recess corresponds to that of the aforementioned WO-83/02983.

I claim:

1. A fastener which comprises:
    a head having a recess extending from an opening to a depth along a central longitudinal axis of the head,
    said head forming at least six partial cylindrical surfaces within the recess that extend substantially parallel to the central longitudinal axis of the head for engagement by a drive tool having surfaces for engaging the partial cylindrical surfaces to rotationally drive the head, said head also forming at least six partial conical surfaces within the recess that coincide with an imaginary cone tapering from said opening to said depth, said partial conical surfaces alternating with said partial cylindrical surfaces, wherein said six partial cylindrical surfaces each have an axial length that is at least approximately equal to an axial length of each of said partial cylindrical surfaces, and said head also forming transition surfaces within the recess that connect said partial cylindrical surfaces to said partial conical surfaces, and wherein said transition surfaces curve in an opposite direction from said partial cylindrical surfaces with respect to the central longitudinal axis of the head.

2. The fastener according to claim 1, wherein the partial cylindrical surfaces project outwardly away from the central longitudinal axis, wherein said transition surfaces project inwardly towards the central longitudinal axis and wherein said partial conical surfaces project outwardly away from the central longitudinal axis.

3. The fastener of claim 2, wherein said partial cylindrical surfaces, said partial conical surfaces and said transition surfaces form a sidewall within the recess that has no flat surfaces and no straight-line junctions between surfaces.

4. The fastener of claim 1, wherein the partial cylindrical surfaces are located further away in a radial direction from the central longitudinal axis than the partial conical surfaces.

5. The fastener of claim 1, wherein the partial conical surfaces are located further away in a radial direction from the central longitudinal axis than the partial cylindrical surfaces.

6. A fastener which comprises:

a head having a projection extending from a base to a height along a central longitudinal axis of the head, said head forming at least six partial cylindrical surfaces that extend substantially parallel to the central longitudinal axis of the head for engagement by a drive tool having surfaces for engaging the partial cylindrical surfaces to rotationally drive the fastener, said projection also forming at least six partial conical surfaces that coincide with an imaginary cone tapering from said base to said height, said partial conical surfaces alternating with said partial cylindrical surfaces, said head also forming at least six partial conical surfaces within the recess that coincide with an imaginary cone tapering from said opening to said depth, said partial conical surfaces alternating with said partial cylindrical surfaces, wherein said six partial cylindrical surfaces each have an axial length that is at least approximately equal to an axial length of each of said partial cylindrical surfaces, and said projection also forming transition surfaces that connect said partial cylindrical surfaces to said partial conical surfaces, and wherein said transition surfaces curve in an opposite direction from said partial cylindrical surfaces with respect to the central longitudinal axis of the head.

7. The fastener according to claim 6, wherein the partial cylindrical surfaces protect outwardly away from the central longitudinal axis, wherein said transition surfaces project inwardly towards the central longitudinal axis and wherein said partial conical surfaces project outwardly away from the central longitudinal axis.

8. The fastener of claim 6, wherein said partial cylindrical surfaces, said partial conical surfaces and said transition surfaces form a sidewall within the recess that has no flat surfaces and no straight-line junctions between surfaces.

9. The fastener of claim 6, wherein the partial cylindrical surfaces are located further away in a radial direction from the central longitudinal axis than the partial conical surfaces.

* * * * *

UNITED STATES PATENT AND TRADEMARK OFFICE
CERTIFICATE OF CORRECTION

PATENT NO. : 5,435,680
DATED : Jul. 25, 1995
INVENTOR(S) : Armin Schuster

It is certified that error appears in the above-indentified patent and that said Letters Patent is hereby corrected as shown below:

Col. 1, line 6: Replace "Lo" with --to--.

Col. 1, line 32: Replace "initialing" with --initiating--.

Col. 1, line 44: Delete the period after "alternately".

Col. 2, line 20: Replace "moan" with --mean--.

Col. 6, line 28: Replace "protect" with --project--.

Signed and Sealed this

Thirtieth Day of January, 1996

Attest:

BRUCE LEHMAN

Attesting Officer

Commissioner of Patents and Trademarks